(12) United States Patent
Knight et al.

(10) Patent No.: US 9,463,515 B2
(45) Date of Patent: Oct. 11, 2016

(54) MITER SAW ASSEMBLY WITH DETACHABLE CIRCULAR SAW

(71) Applicant: Sears Brands, L.L.C., Hoffman Estates, IL (US)

(72) Inventors: Colin Knight, Winnetka, IL (US); Milos V. Coric, Lincolnshire, IL (US); Sam Bradley, Mundelein, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 69 days.

(21) Appl. No.: 14/195,224

(22) Filed: Mar. 3, 2014

(65) Prior Publication Data

US 2015/0246399 A1   Sep. 3, 2015

(51) Int. Cl.
| | |
|---|---|
| *B26D 1/14* | (2006.01) |
| *B23D 45/04* | (2006.01) |
| *B27G 19/02* | (2006.01) |
| *B23D 47/02* | (2006.01) |
| *B23D 59/00* | (2006.01) |
| *B27G 19/04* | (2006.01) |

(52) U.S. Cl.
CPC ............ *B23D 45/044* (2013.01); *B23D 47/02* (2013.01); *B23D 59/007* (2013.01); *B27G 19/02* (2013.01); *B27G 19/04* (2013.01); *Y10T 83/606* (2015.04); *Y10T 83/7697* (2015.04)

(58) Field of Classification Search
CPC .... B23D 45/028; B23D 45/04; B23D 47/04; B23D 45/044; B23D 47/02; B23D 59/007; B27G 19/02; B27G 19/04; Y10T 83/606; Y10T 83/697
USPC .................. 83/471.3, 581, 471.2, 486.1, 490
See application file for complete search history.

(56) References Cited

U.S. PATENT DOCUMENTS

| | | | |
|---|---|---|---|
| 3,680,609 A * | 8/1972 | Menge .................... | 83/471.2 |
| 4,587,875 A | 5/1986 | Deley | |
| 4,648,301 A * | 3/1987 | Scott ....................... | 83/464 |
| 8,539,870 B2 * | 9/2013 | Behr ....................... | 83/471.3 |
| 9,027,450 B1 * | 5/2015 | Ana ........................ | 83/471.3 |
| 2008/0210072 A1 | 9/2008 | Chang | |
| 2010/0236369 A1 | 9/2010 | Sudou | |
| 2013/0092001 A1 | 4/2013 | Behr | |

FOREIGN PATENT DOCUMENTS

GB    966065    8/1964

OTHER PUBLICATIONS

Partial European Search Report from European Application No. 15156791.4 dated Jun. 25, 2015.
Eurpoean Patent Office, Communication with extended European search report, in application No. 15156791.4, dated Oct. 28, 2015 (10 pages).

* cited by examiner

*Primary Examiner* — Omar Flores Sanchez

(57) ABSTRACT

A miter saw assembly including a circular saw detachably coupled to a miter base is provided. The circular saw includes a circular blade, a motor, a power supply, and an attachment mechanism. The motor is operable to rotate the circular blade. The power supply is operable to provide power to the motor. The attachment mechanism detachably couples with a coupling arm of the miter base. The miter base includes a base and a support arm. The support arm includes the coupling arm, a vertical pivot, and a horizontal pivot. The vertical pivot is operable to pivot the coupling arm in a vertical plane. The horizontal pivot is rotatably coupled with the base. The horizontal pivot is operable to rotate the coupling arm in a horizontal plane.

13 Claims, 15 Drawing Sheets

MITER SAW ASSEMBLY WITH DETACHABLE CIRCULAR SAW

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to power saws such as miter saws and circular saws. More specifically, certain embodiments of the present invention relate to a miter saw assembly that includes a detachably coupled circular saw.

BACKGROUND OF THE INVENTION

In typical households, garage and other work area space is limited, particularly for storage of non-vehicular items. Thus, consumers are often forced to choose between one item and another simply because their work area and/or garage do not have enough space to accommodate both. Further, although a consumer may have occasional use for either a circular saw or miter saw, a consumer may not want the investment of space and money for two units.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A miter saw assembly with a detachably coupled circular saw, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
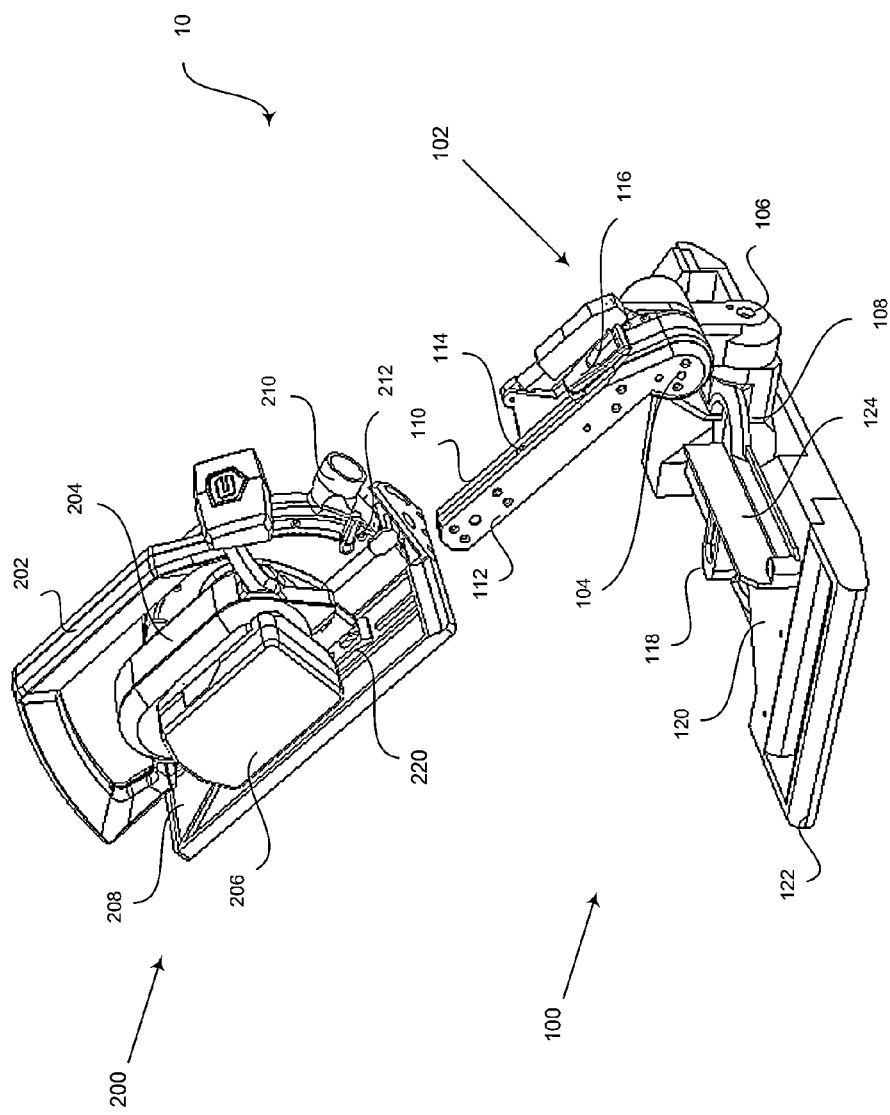
FIG. 1 illustrates a rear side perspective view of an exemplary miter saw assembly with a circular saw detached from a miter base, in accordance with an example embodiment of the present invention.

Aspects of the present invention are related to a miter saw assembly with a detachably coupled circular saw. An example embodiment of the present invention aids users by providing a power saw assembly that may be used as both a circular saw and a miter saw, for example.

Various embodiments provide a miter saw assembly 10 including a circular saw 200 detachably coupled to a miter base 100. The circular saw 200 includes a circular blade 218, a motor 204, a power supply 206, and an attachment mechanism 220. The motor 204 is operable to rotate the circular blade 218. The power supply 206 is operable to provide power to the motor 204. The attachment mechanism 220 detachably couples with a coupling arm of the miter base 100. The miter base 100 includes a base 120 and a support arm 102. The support arm 102 includes the coupling arm, a vertical pivot 104, and a horizontal pivot 108. The vertical pivot 104 is operable to pivot the coupling arm in a vertical plane. The horizontal pivot 108 is rotatably coupled with the base 120. The horizontal pivot 108 is operable to rotate the coupling arm in a horizontal plane.

As utilized herein, the terms "exemplary" or "example" means serving as a non-limiting example, instance, or illustration. As utilized herein, the term "e.g." introduces a list of one or more non-limiting examples, instances, or illustrations.

Figure 5:
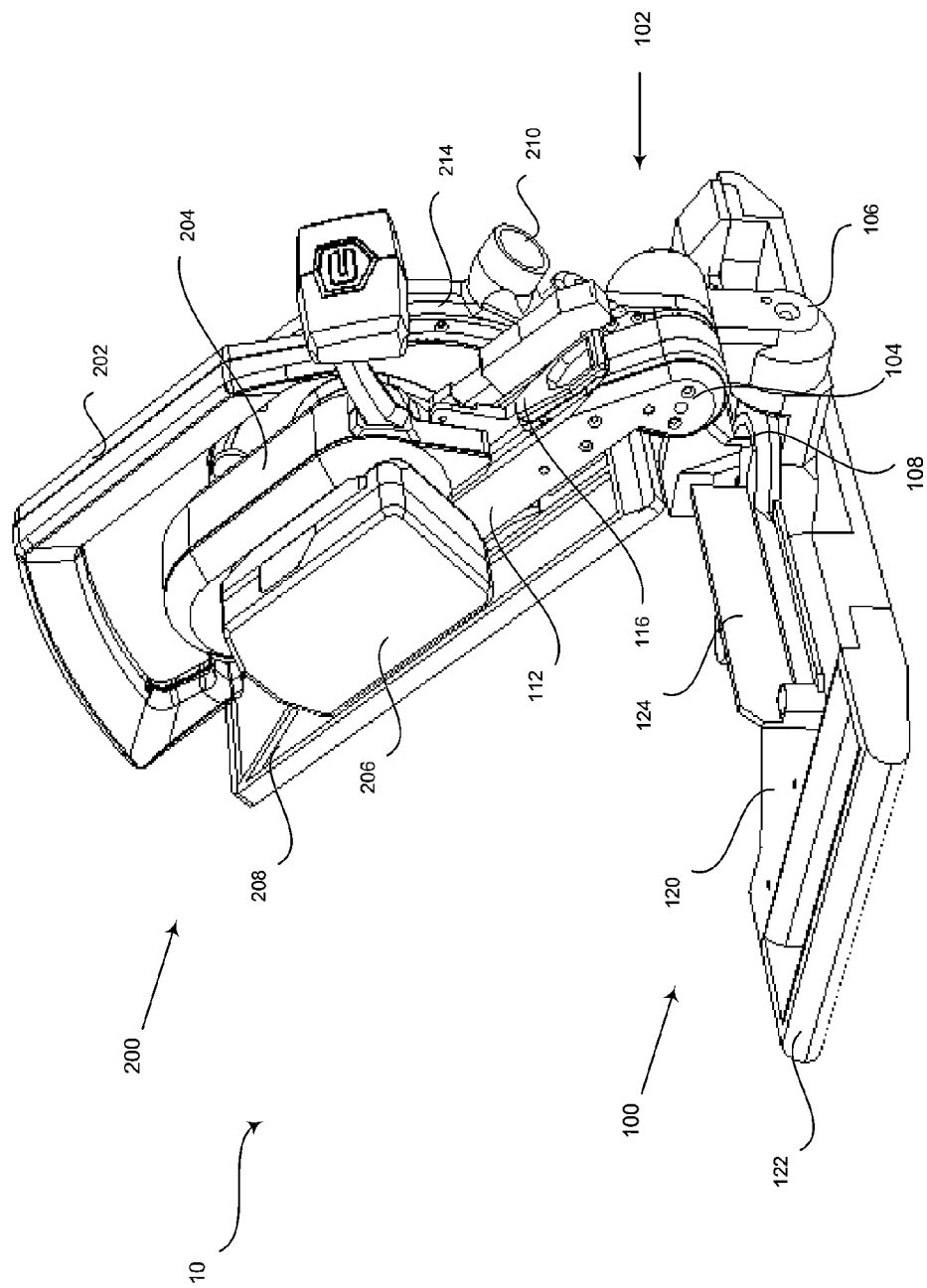
FIG. 5 illustrates a rear side perspective view of an exemplary miter saw assembly with a circular saw detachably coupled to a miter base, in accordance with an example embodiment of the present invention.
Figure 6:
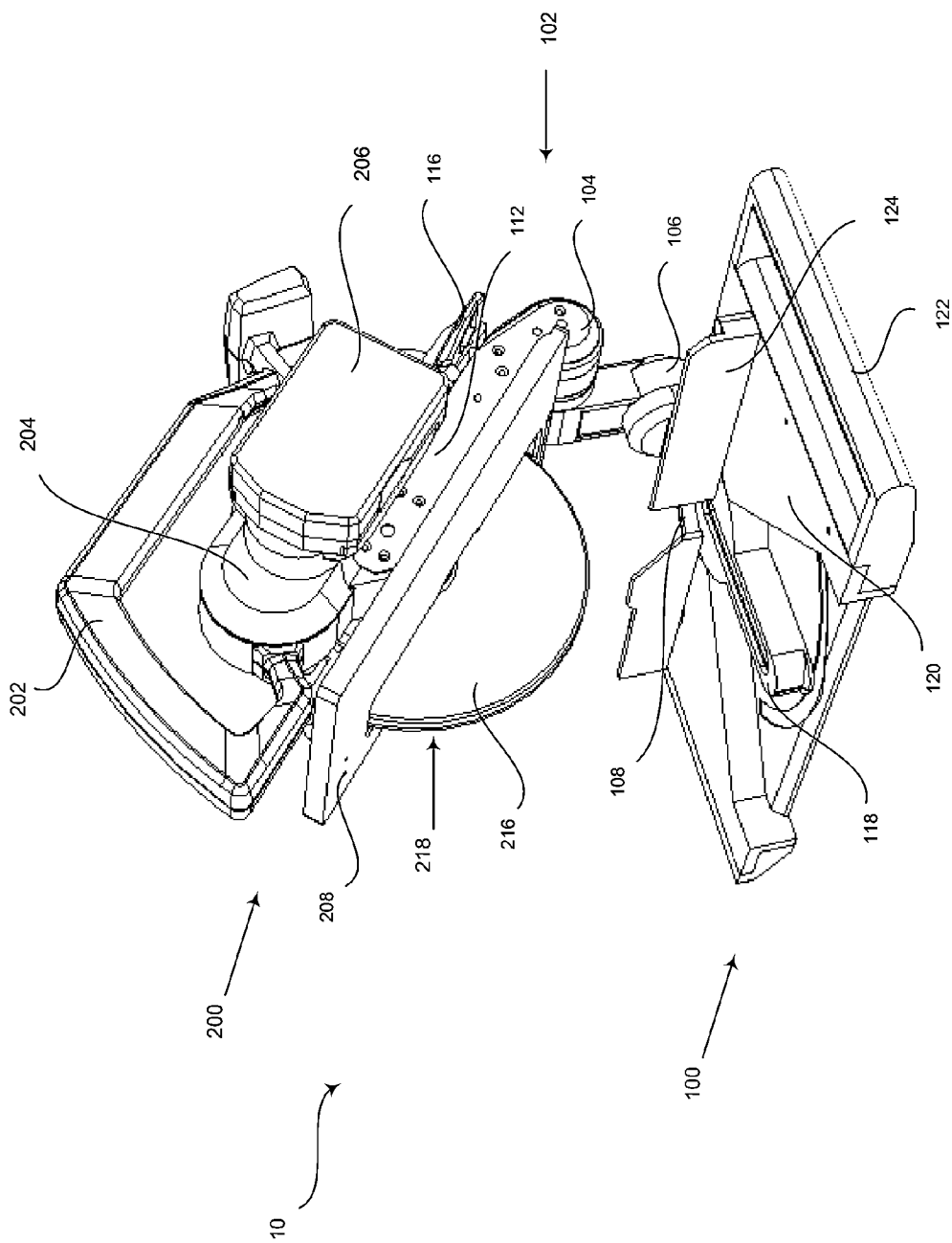
FIG. 6 illustrates a front side perspective view of an exemplary miter saw assembly with a circular saw detachably coupled to a miter base, in accordance with an example embodiment of the present invention.

FIGS. 1-4 illustrate various views of an exemplary miter saw assembly 10 with a circular saw 200 detached from a miter base 100, in accordance with an example embodiment of the present invention. FIGS. 5-6 illustrate views of an exemplary miter saw assembly 10 with a circular saw 200 detachably coupled to a miter base 100, in accordance with an example embodiment of the present invention.

Referring to FIGS. 1-6, a miter saw assembly 10 comprises a miter base 100 and a detachably coupleable circular saw 200. The miter base 100 comprises a support arm 102 and a base 120. The support arm 102 may comprise a vertical pivot 104, a bevel pivot 106 (if the miter saw assembly 10 is a compound miter saw, for example), a horizontal pivot 108, and a coupling arm. In various embodiments, such as if the miter saw assembly 10 is a sliding compound miter saw, the support arm 102 may comprise sliding rails (not shown) such that the circular saw 200 can be pushed towards the rear of the miter base 100 and/or pulled towards the front of the miter base 100 while in the cutting position. The vertical pivot 104 allows a circular saw 200 detachably coupled to the coupling arm to pivot downward to a cutting position and upward from the cutting position. The bevel pivot 106 allows a circular saw 200 detachably coupled to the coupling arm to tilt sideways to provide beveled cuts, for example. In certain embodiments, the circular saw 200 can be folded at the bevel pivot 106 to lay on top of the miter base 100 to provide for easier transport of the miter saw assembly 10. The horizontal pivot 108 allows a circular saw 200 detachably coupled to the coupling arm to rotate horizontally to provide angled cuts, for example.

The coupling arm is operable to detachably couple with the circular saw 200. In an example embodiment, the coupling arm may comprise a slide 110, a slide cover 112, a locking mechanism 114, a locking lever 116, and a support arm lever 126. The slide 110 extends from the vertical pivot 104 and detachably couples with an attachment mechanism 220 of the circular saw 200. The locking mechanism 114 secures the slide 110 to the attachment mechanism 220 when the circular saw 200 is coupled to the miter base 100. The locking lever 116 is operable to engage the locking mechanism 114 to the attachment mechanism 220 when in a closed position and release the locking mechanism 114 from the attachment mechanism 220 so that the circular saw 200 can be removed from the miter base 100 when in an open position. The slide cover 112 houses the locking mechanism 114 and provides a clean finish for the coupling arm.

The support arm lever 126 may be a lever that comprises a gear 127 that is rotated with the vertical pivot 104 to extend the support arm lever 126 from the coupling arm and retract the support arm lever 126 to the coupling arm. The support arm lever 126 is operable to mate with and move a blade guard lever 212 of the circular saw 200 to open a blade guard 216 as the circular saw 200 attached to the coupling arm pivots downward at the vertical pivot 104, and to close the blade guard 216 as the circular saw 200 pivots upward. For example, when not in use, a blade guard 216 can cover a blade 218 of the circular saw 200 to protect users and passersby from contacting the blade 218 of the circular saw 200. As the circular saw 200 is pivoted to a cutting position, the support arm lever 126 can extend from the coupling arm and mate with the blade guard lever 212 to slide the blade guard lever 212 from a closed position to an open position. The blade guard 216 retracts to expose the blade 218 as the blade guard lever 212 is moved from the closed position to the open position. As the circular saw 200 is pivoted upward from the cutting position, the blade guard lever 212 is moved from the open position to the closed position such that the blade guard 216 extends to cover the blade 218.

The base 120 comprises a blade receiving miter table 118, a handle 122, and a fence, 124. The handle 122 can be grasped to transport the miter saw assembly 10. The blade receiving miter table 118 is operable to receive a cutting blade 218 of a circular saw 200 as the circular saw 200 vertically pivots downward to a cutting position. In various embodiments, such as if the miter saw assembly 10 is a sliding compound miter saw, the blade 218 of the circular saw 200 can be pushed within the blade receiving miter table 118 towards the rear of the miter base 100 and/or pulled within the blade receiving miter table 118 towards the front of the miter base 100 while in the cutting position. The blade receiving miter table 118 rotates horizontally about the horizontal pivot 108 in unison with the support arm 102 when the circular saw 200 coupled to the coupling arm is rotated horizontally to change an angle of a cut, for example.

The fence 124 is operable to provide a precise cutting angle between the plane of the blade 218 and the plane of a workpiece edge when the workpiece is held against the fence 124. The default angle of the fence 124 in relation to the blade 218 of the circular saw 200 may be ninety degrees, for example. The angle of the fence 124 in relation to the blade 218 can be adjusted by, for example, horizontally rotating the circular saw 200 coupled to the coupling arm about the horizontal pivot 108.

The circular saw 200 may comprise a handle 202, a motor 204, a power supply 206, a foot 208, a dust port 210, a blade guard lever 212, a housing 214, a blade guard 216, a blade 218, and an attachment mechanism 220. The handle 202 is grasped to operate the circular saw 200 independently when the circular saw 200 is decoupled from the miter base 100 and to maneuver the circular saw 200 as guided by the support arm 102 when attached to the coupling arm of the miter base 100. The handle 202 can include a grip, such as rubber, grooves, or any suitable material or texture. The handle 202 may include buttons, triggers, or the like for activating the circular saw 200. The motor 204 is powered by a power supply 206 and is operable to rotate the blade 218 when activated. The power supply 206 can be an alternating current (AC) power supply (e.g., through a cord from a plug that mates with a wall socket), a direct current (DC) power supply (e.g., a battery), or any suitable power supply.

The foot 208 is operable to rest on a surface that is being cut. Particularly, the foot 208 is generally parallel with the surface being cut when the circular saw 200 is pivoted downward into the cutting position. In various embodiments, the foot 208 may automatically adjust to remain generally parallel with the surface being cut as the coupling arm is tilted sideways by the bevel pivot 106. The foot 208 can be movable to adjust a depth of a cut. The dust port 210 can extend from the housing 214 and is operable to discharge dust formed during a sawing operation. A dust bag (not shown) can be attached to the dust port 210 to collect the dust discharged through the dust port.

The blade guard lever 212 may be a lever that extends through a slot in the housing 214 and comprises a lever gear 213 that moves within the housing 214 to extend and retract a blade guard 216. For example, when the circular saw 200 is detached from the miter base 100 for operation as a circular saw, a user can slide the blade guard lever 212 in a first direction to retract the blade guard 216 such that the blade 218 of the circular saw 200 is exposed so the user can cut a workpiece, for example. The blade guard lever 212 is moved in the second direction to extend the blade guard 216 to cover the blade 218 when the circular saw 200 is not in use, for example. As another example, when the circular saw 200 is attached to the miter base 100 for operation as a miter saw, the blade guard lever 212 may be moved in the first direction by a component of the miter base 100, such as the support arm lever 126, to retract the blade guard 216 such that the blade 218 of the circular saw 200 is exposed. The support arm lever 126 moves the blade guard lever 212 to open the blade guard 216 as the circular saw 200 attached to the coupling arm pivots downward at the vertical pivot 104 into the cutting position. The blade guard lever 212 moves in the second direction to extend the blade guard 216 to cover the blade 218 as the circular saw 200 pivots upward at the vertical pivot 104 from the cutting position.

The blade guard 216 protects users and passersby from contacting the blade 218 when the circular saw 200 and/or miter saw assembly 10 is not in use. The blade guard 216 comprises a shield that is extended to cover the blade 218 and retracted to expose the blade 218. The blade guard 216 may comprise a gear 217, for example, which is rotated by the blade guard lever 212 to extend and retract the blade guard 216.

The blade 218 is a circular blade that is rotated by the motor 204 to cut a workpiece. In certain embodiments, different blades 218 can be used for cutting different workpiece materials, such as wood, plastic, metal, or any suitable material. The different blades 218 can comprise teeth of various sizes and configurations based on the application. The blade 218 may be metal, such as steel, titanium, or any suitable material. The blade 218 is removable and replaceable with other circular blades. For example, a blade 218 may be removed and replaced if the workpiece material changes or if the blade is worn, among other things.

The attachment mechanism 220 is operable to detachably couple the circular saw 200 to the miter base 100. Particularly, the attachment mechanism 220 may detachably couple to the coupling arm of the miter base 100. For example, the attachment mechanism 220 can receive the slide 110 that extends from the vertical pivot 104 of the miter base 100. The slide 110 can be secured within the attachment mechanism 220 by a locking mechanism 114 of the miter base 100, or any suitable locking mechanism on the miter base 100 or the circular saw 200.

Figure 7:
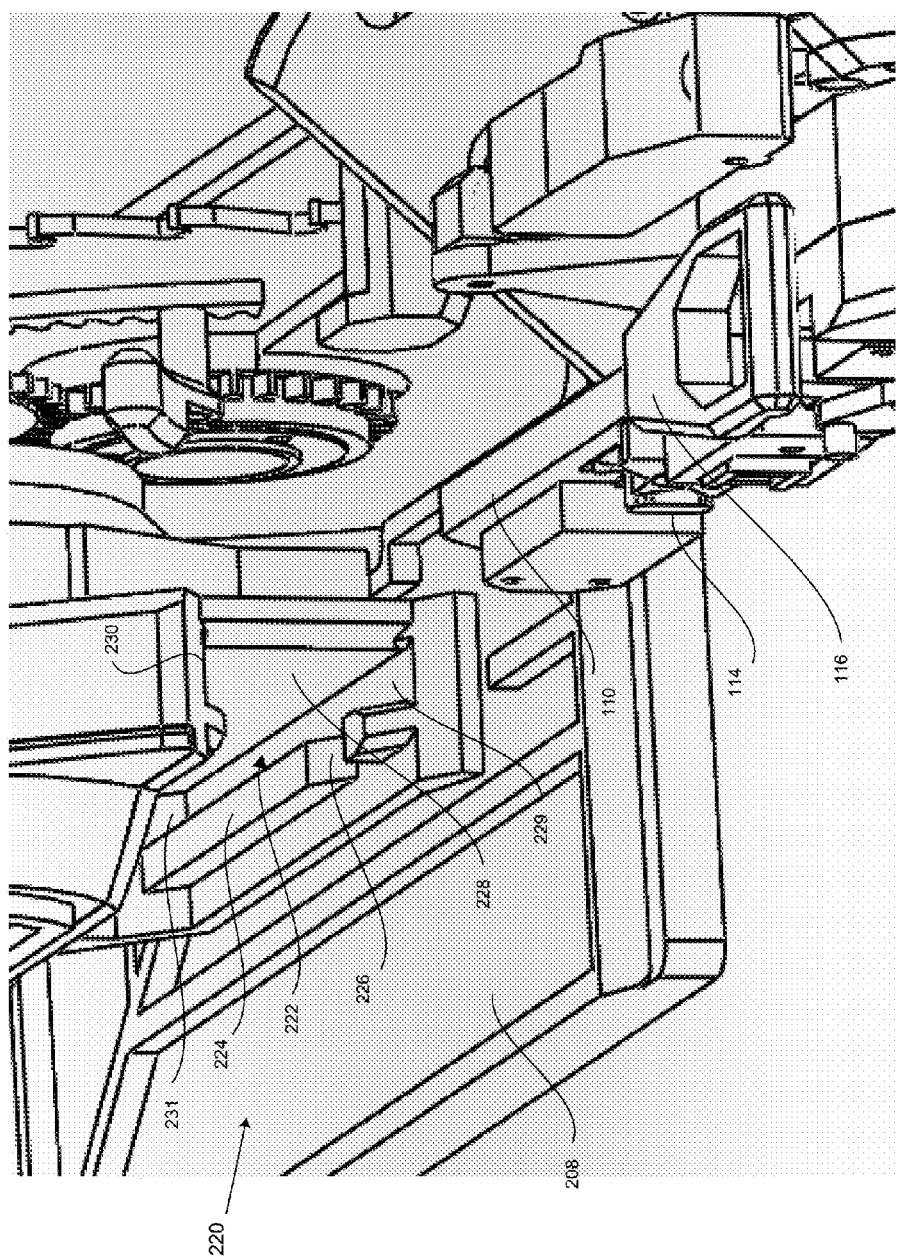
FIG. 7 illustrates a rear side perspective view of an exemplary attachment mechanism for detachably coupling a circular saw to a miter base, in accordance with an example embodiment of the present invention.
Figure 8:
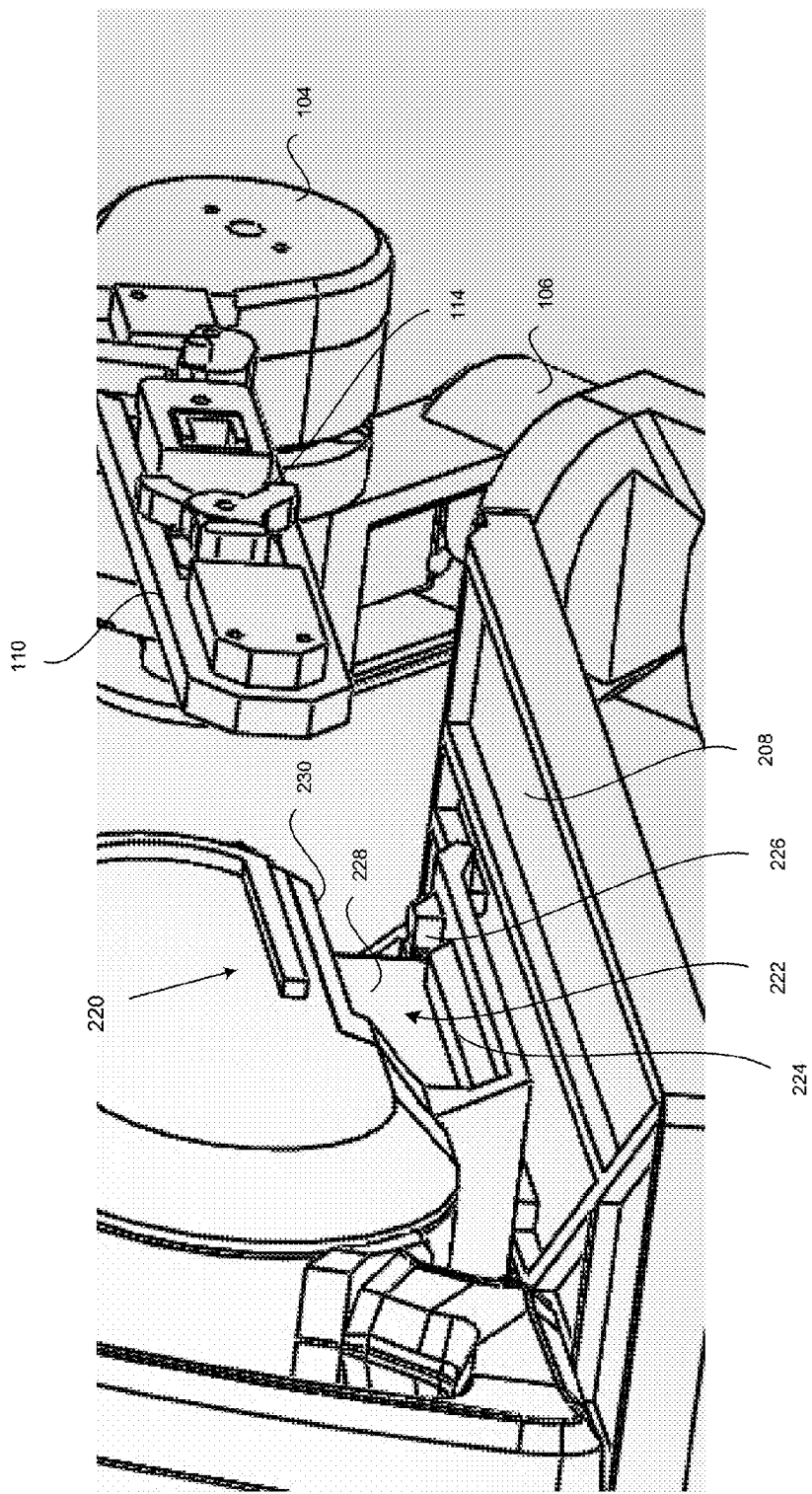
FIG. 8 illustrates a front side perspective view of an exemplary attachment mechanism for detachably coupling a circular saw to a miter base, in accordance with an example embodiment of the present invention.

FIGS. 7-8 illustrate perspective views of an exemplary attachment mechanism 220 for detachably coupling a circular saw 200 to a miter base 100, in accordance with an example embodiment of the present invention. Referring to FIGS. 7-8, the attachment mechanism 220 comprises a slot 222 formed in the housing 214 between slot indent(s) 224, a slot side wall 228, a slot bottom wall 229, a slot top wall 230, and a slot end 231. The slot indent(s) 224 can be attached to or integrated with the slot bottom wall 229 and/or slot top wall 230. The slot 222 is operable to receive a slide 110 that fits snugly within the slot 222 to detachably couple the circular saw 200 to the miter base 100. The slot indent(s) 224 can comprise an indent gap 226 operable to mate with the locking mechanism 114 to secure the slide 110 within the slot 222. In various embodiments, the slot 222 and slide 110 can be square or rectangular shaped. Alternatively, as illustrated in FIGS. 9-10 and discussed below, for example, the slide 110 and/or slot 222 may be trapezoidal shaped.

Figure 3:
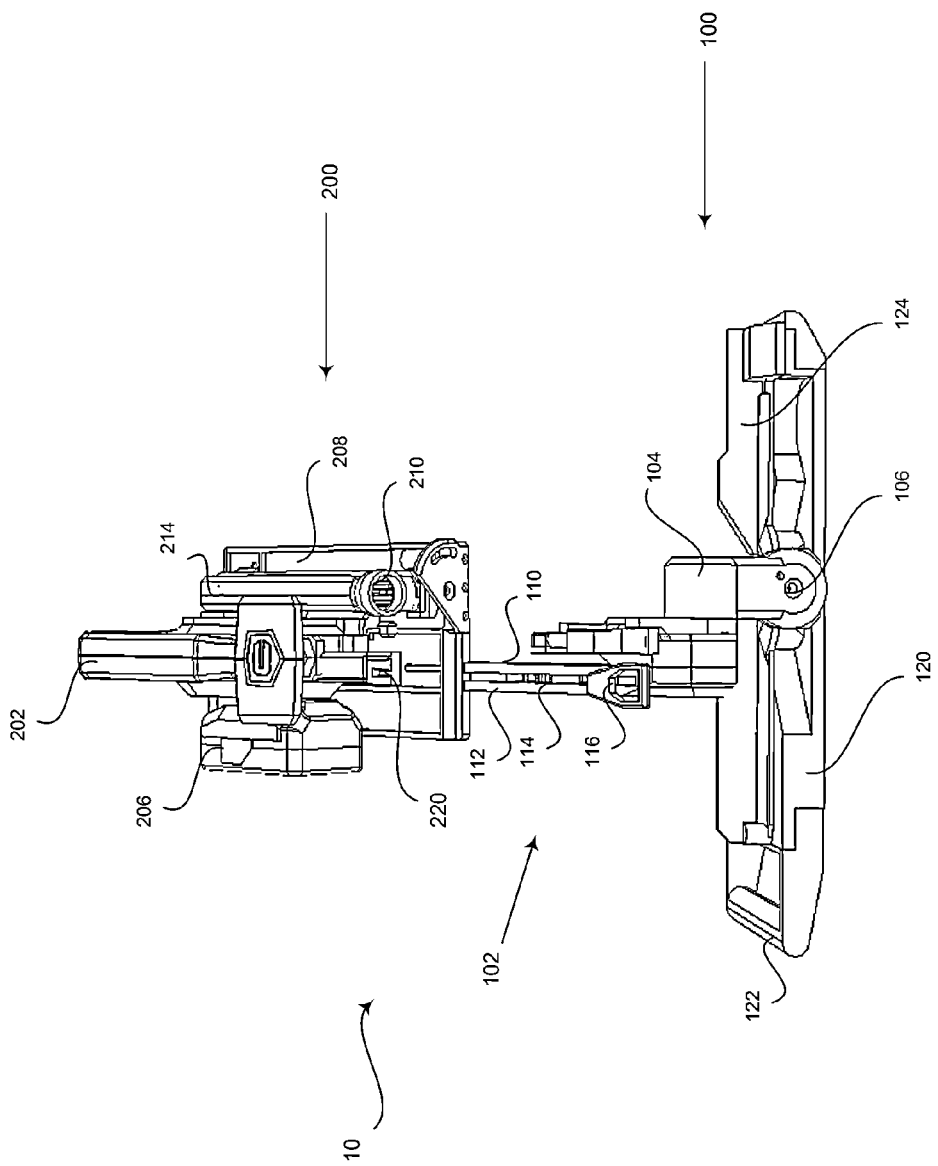
FIG. 3 illustrates a rear perspective view of an exemplary miter saw assembly with a circular saw detached from a miter base, in accordance with an example embodiment of the present invention.
Figure 4:
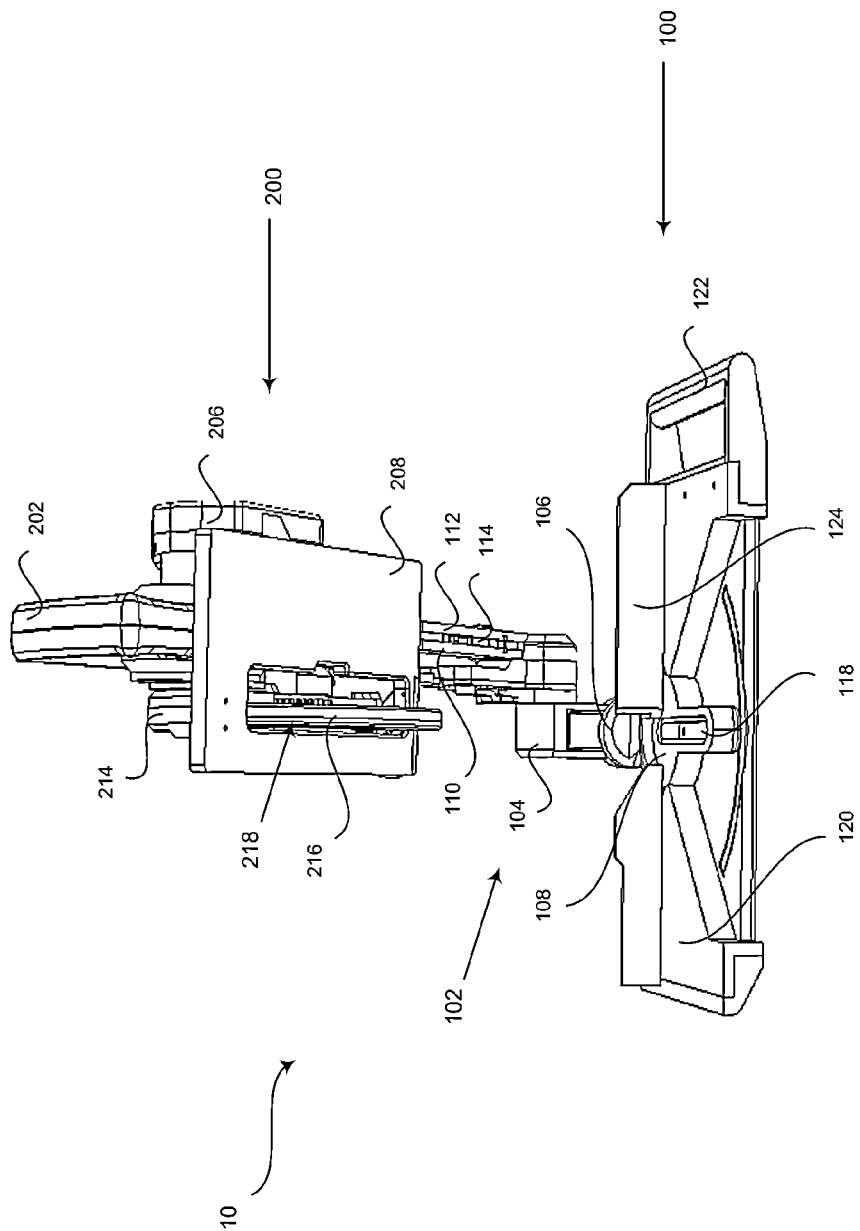
FIG. 4 illustrates a front perspective view of an exemplary miter saw assembly with a circular saw detached from a miter base, in accordance with an example embodiment of the present invention.

The attachment mechanism 220 illustrated in FIGS. 7-8 shares various characteristics with the attachment mechanism 220 illustrated in FIGS. 1 and 3 as described above.

Figure 9:
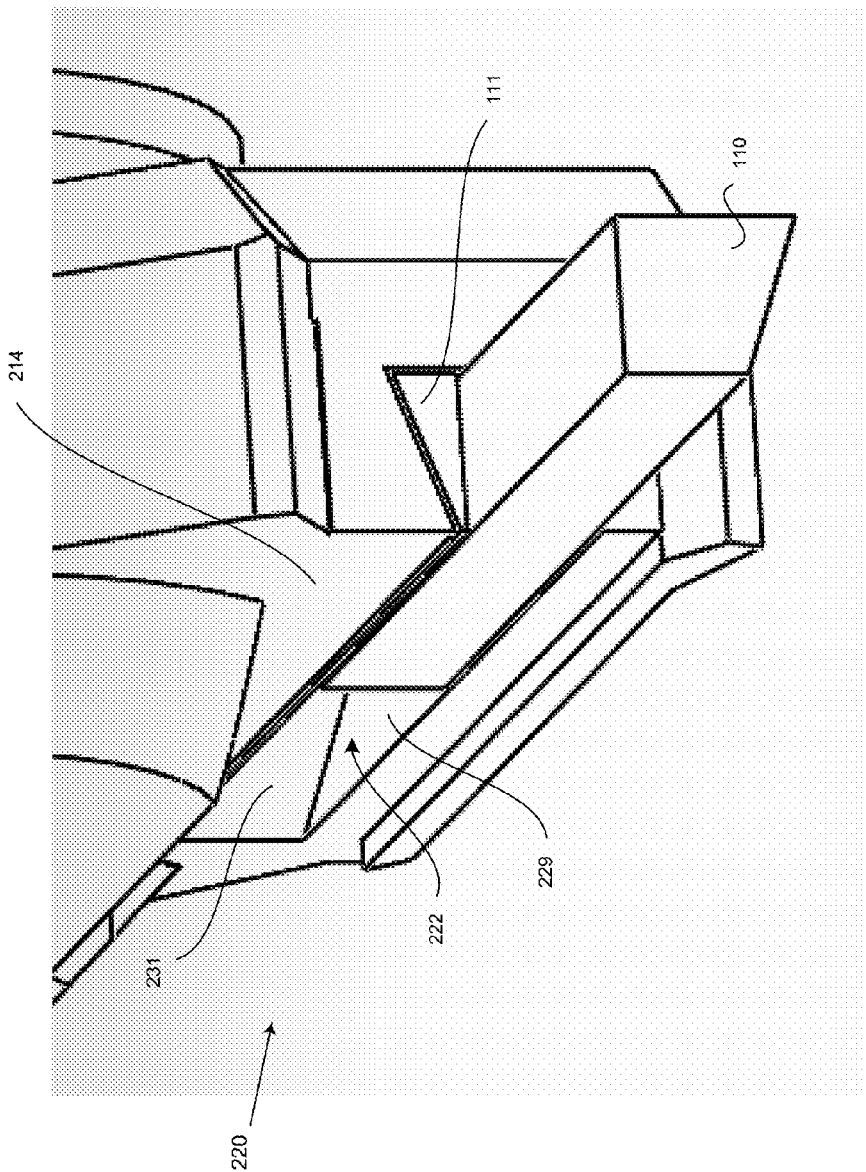
FIG. 9 illustrates a rear side perspective view of an exemplary slide and attachment mechanism with a slide clamp for detachably coupling a circular saw to a miter base, in accordance with an example embodiment of the present invention.
Figure 10:
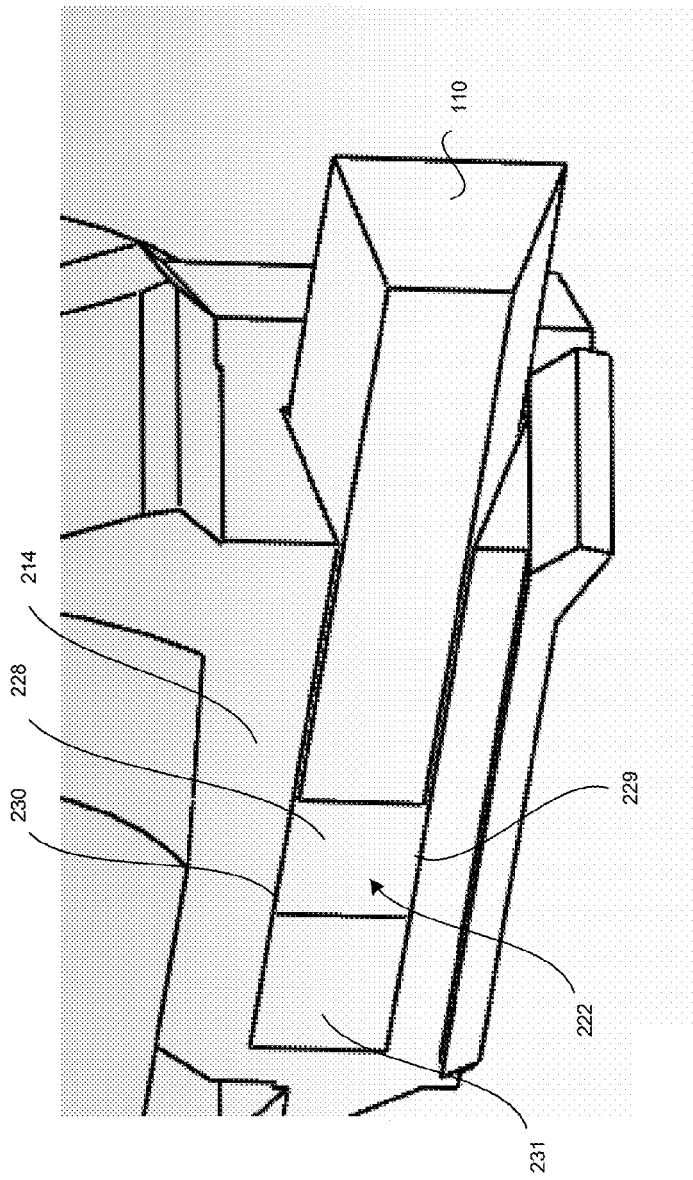
FIG. 10 illustrates a side perspective view of an exemplary slide and an attachment mechanism for detachably coupling a circular saw to a miter base, in accordance with an example embodiment of the present invention.

FIG. 9 illustrates a rear side perspective view of an exemplary slide 110 and attachment mechanism 220 with a slide clamp 111 for detachably coupling a circular saw 200 to a miter base 100, in accordance with an example embodiment of the present invention. Referring to FIG. 9, the attachment mechanism 220 comprises a slot 222 formed in the housing 214. In addition to the slot bottom wall 220 and slot end 231 illustrated in FIG. 9, the slot 222 may comprise slot indent(s) 224, a slot side wall 228, and a slot top wall 230 as described above with reference to FIGS. 7-8. The slot 222 can be trapezoidal shaped and comprise a slide clamp 111 attached to at least one of the slot side wall 228, the slot bottom wall 229, or the slot top wall 230 (as illustrated in FIG. 9). The slide clamp 111 can be extended into the slot 222 by a tightening mechanism such as screws (not shown) that extend through the housing 214 to push the slide clamp 111. The slide 110 may be trapezoidal shaped such that the slide 110 snugly fits within the slot 222 with the slide clamp 111. In operation, the slide 110 is inserted into the slot 222 to attach the circular saw 200 to the miter base 100 and the tightening mechanism is tightened extending the slide clamp 111 to squeeze the slide 110 against at least two surfaces 224, 228-231 of the slot 222. For example, as illustrated in FIG. 9, tightening the slide clamp 111 exerts a pressure on the slide 110 against the slot side wall 228 and slot bottom wall 229 (i.e., datum surfaces). The tightening mechanism provides a consistent angle between the blade 218 and the miter base 100 each time the circular saw 200 is attached to the miter base 100 to form a miter saw.

The slide 110 and attachment mechanism 220 illustrated in FIG. 9 shares various characteristics with the slide 110 and attachment mechanism 220 illustrated in one or more of FIGS. 1-4 and 7-8 as described above.

FIG. 10 illustrates a side perspective view of an exemplary slide 110 and an attachment mechanism 220 for detachably coupling a circular saw 200 to a miter base 100, in accordance with an example embodiment of the present invention. Referring to FIG. 10, the attachment mechanism 220 comprises a slot 222 formed in the housing 214. Although not specifically illustrated in FIG. 10, the slot 222 may comprise slot indent(s) 224 as described above with reference to FIGS. 7-8. The slot 222 can be trapezoidal shaped and may comprise a tightening mechanism such as screws (not shown) that extend through the housing 214 into the slot when tightened. The slide 110 may be trapezoidal shaped such that the slide 110 snugly fits within the slot 222. In operation, the slide 110 is inserted into the slot 222 to attach the circular saw 200 to the miter base 100 and the tightening mechanism is tightened to squeeze the slide 110 against at least two surfaces 224, 228-231 of the slot 222. For example, as illustrated in FIG. 10, tightening the tightening mechanism exerts a pressure on the slide 110 against the slot side wall 228 and slot bottom wall 229 (i.e., datum surfaces). The tightening mechanism provides a consistent angle between the blade 218 and the miter base 100 each time the circular saw 200 is attached to the miter base 100 to form a miter saw.

The slide 110 and attachment mechanism 220 illustrated in FIG. 10 shares various characteristics with the slide 110 and attachment mechanism 220 illustrated in one or more of FIGS. 1-4 and 7-9 as described above.

Figure 11:
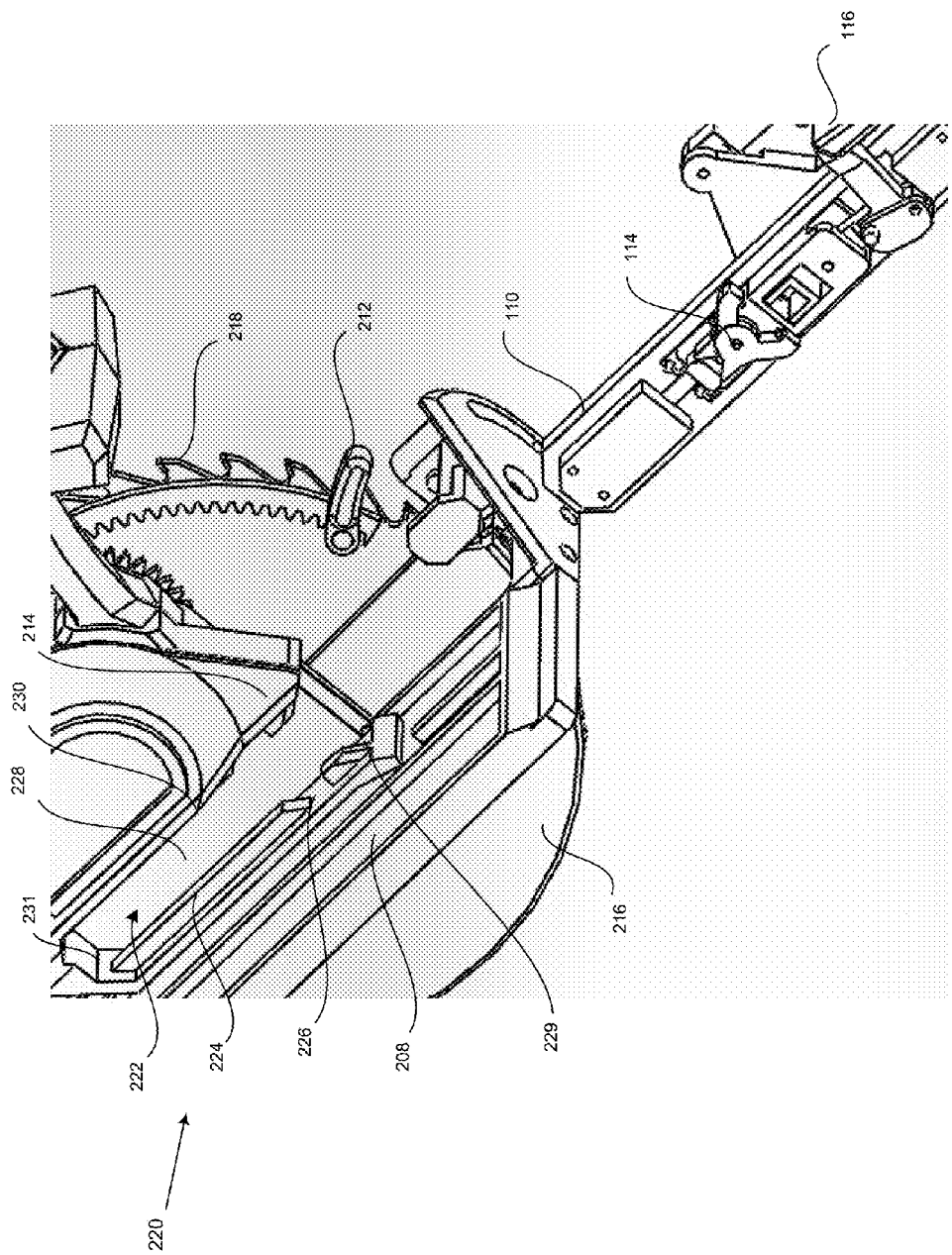
FIG. 11 illustrates a side perspective view of an exemplary attachment mechanism and an exemplary slide including an exemplary locking mechanism for securing a detachably coupleable circular saw to a miter base, in accordance with an example embodiment of the present invention.
Figure 12:
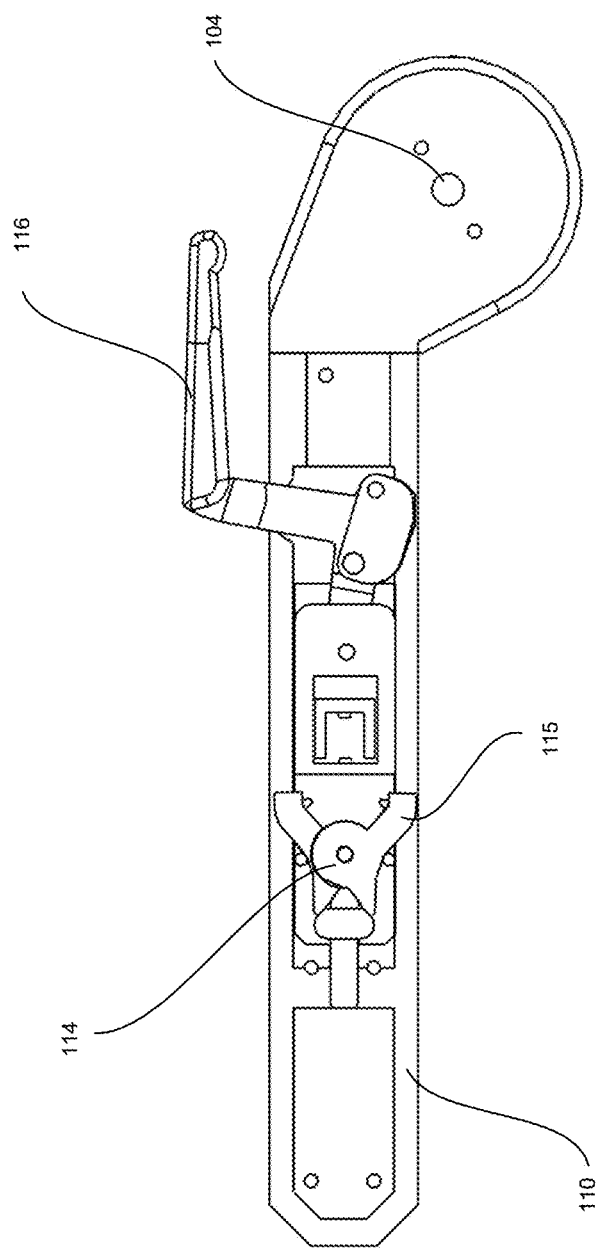
FIG. 12 illustrates a side view of an exemplary locking mechanism in a locked position, in accordance with an example embodiment of the present invention.
Figure 13:
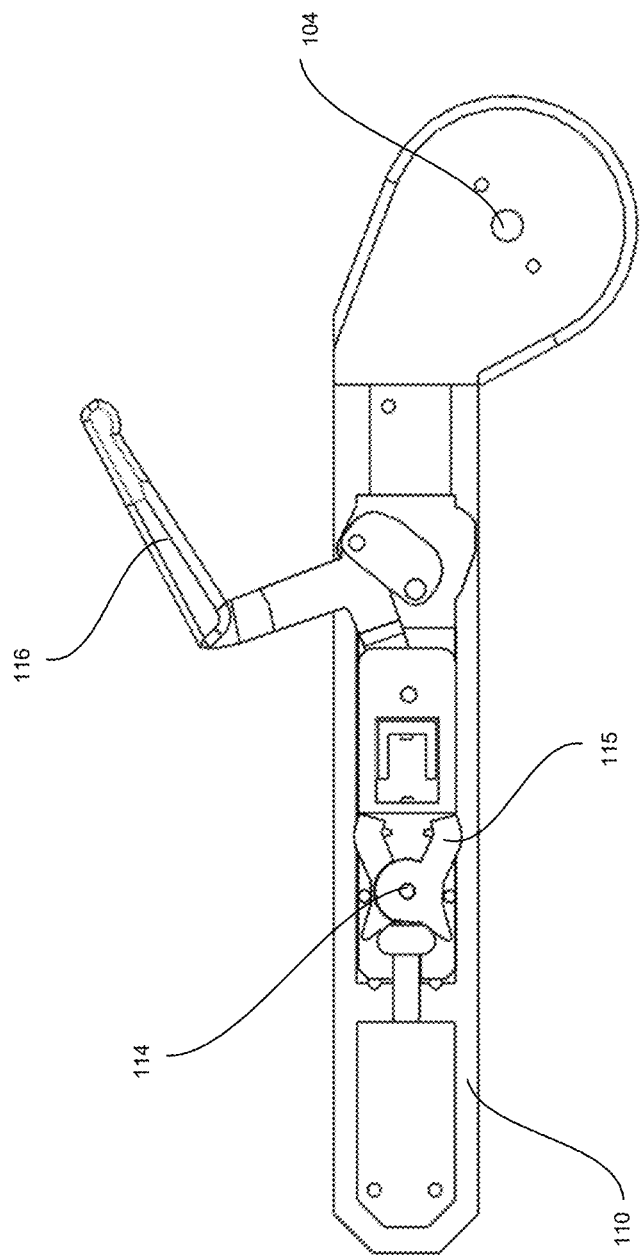
FIG. 13 illustrates a side view of an exemplary locking mechanism in a release position, in accordance with an example embodiment of the present invention.

FIG. 11 illustrates a side perspective view of an exemplary attachment mechanism 220 and an exemplary slide 110 including an exemplary locking mechanism 114 for securing a detachably coupleable circular saw 200 to a miter base 100, in accordance with an example embodiment of the present invention. FIG. 12 illustrates a side view of an exemplary locking mechanism 114 in a locked position, in accordance with an example embodiment of the present invention. FIG. 13 illustrates a side view of an exemplary locking mechanism 114 in a release position, in accordance with an example embodiment of the present invention.

Referring to FIGS. 11-13, the attachment mechanism 220 comprises a slot 222 formed in the housing 214 between slot indent(s) 224, a slot side wall 228, a slot bottom wall 229, a slot top wall 230, and a slot end 231. The slot indent(s) 224 can be attached to or integrated with the slot bottom wall 229 and/or slot top wall 230. The slot 222 is operable to receive a slide 110 that fits snugly within the slot 222 to detachably couple the circular saw 200 to the miter base 100. The slot indent(s) 224 can comprise an indent gap 226 operable to mate with the locking mechanism 114 to secure the slide 110 within the slot 222.

The slide 110 may extend from the vertical pivot 104 and can detachably couple with an attachment mechanism 220 of the circular saw 200. The locking mechanism 114 is attached to the slide 110 and secures the slide 110 to the attachment mechanism 220 when the circular saw 200 is coupled to the miter base 100. The locking lever 116 is operable to engage the locking mechanism 114 with the attachment mechanism 220 when in a closed position and release the locking mechanism 114 from the attachment mechanism 220 so that the circular saw 200 can be removed from the miter base 100 when in an open position. Particularly, the locking mechanism 114 may comprise locking protrusions 115 operable to extend when the locking lever 116 is moved to a closed position and retract when the locking lever 116 is moved to an open position. The locking protrusions 115 can snap into the indent gap(s) 226 in the slot indent(s) 224 to secure the circular saw 200 to the miter base 100 when the slide 110 is inserted into the slot 222 and the locking lever 116 is closed. The locking protrusions 115 retract from the indent gap(s) 226 in the slot indent(s) 224 to unlock the circular saw 200 from the miter base 100 when the locking lever 116 is opened.

Figure 14:
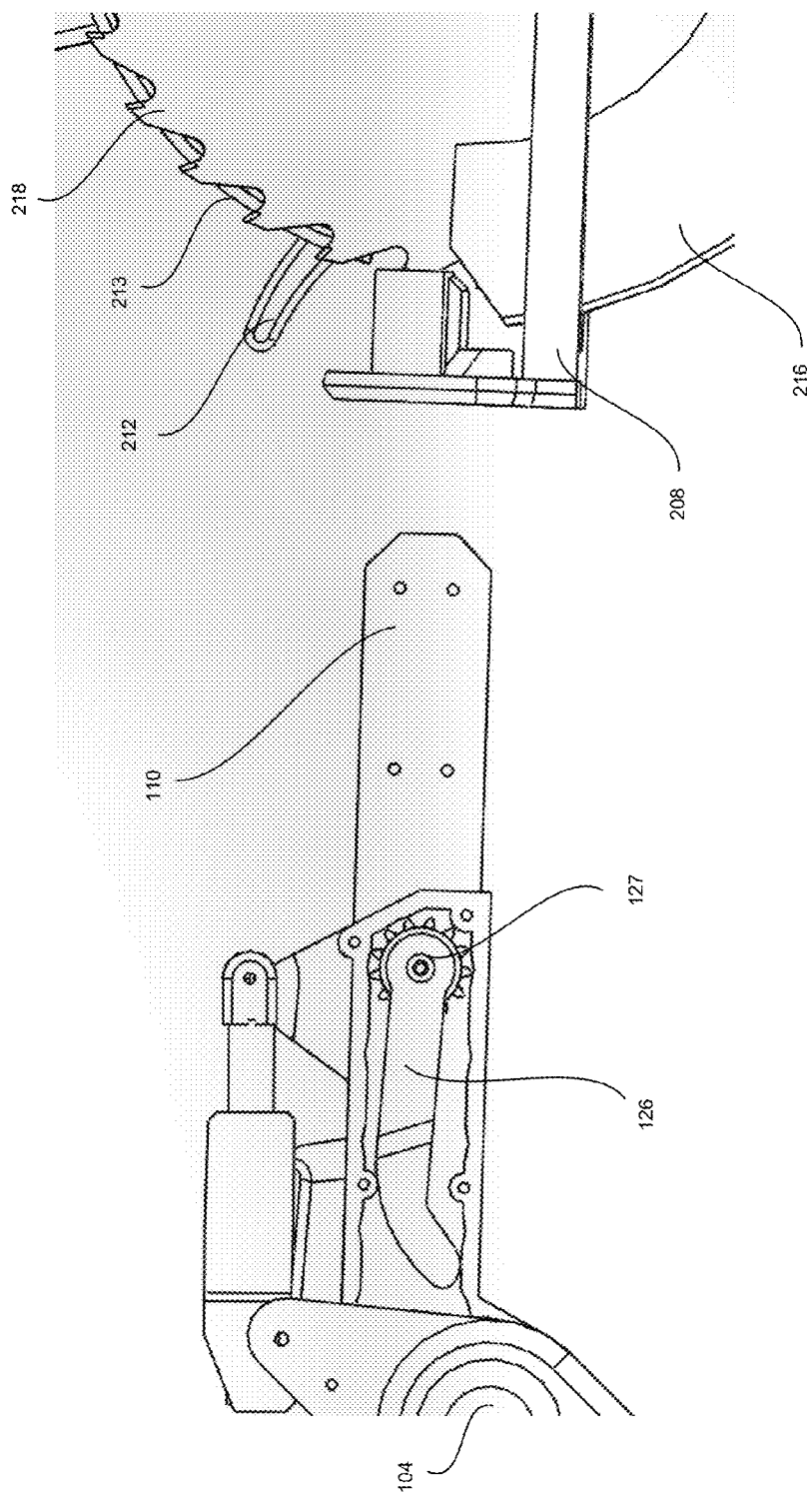
FIG. 14 illustrates a side view of an exemplary blade guard mechanism with the circular saw housing removed, in accordance with an example embodiment of the present invention.
Figure 15:
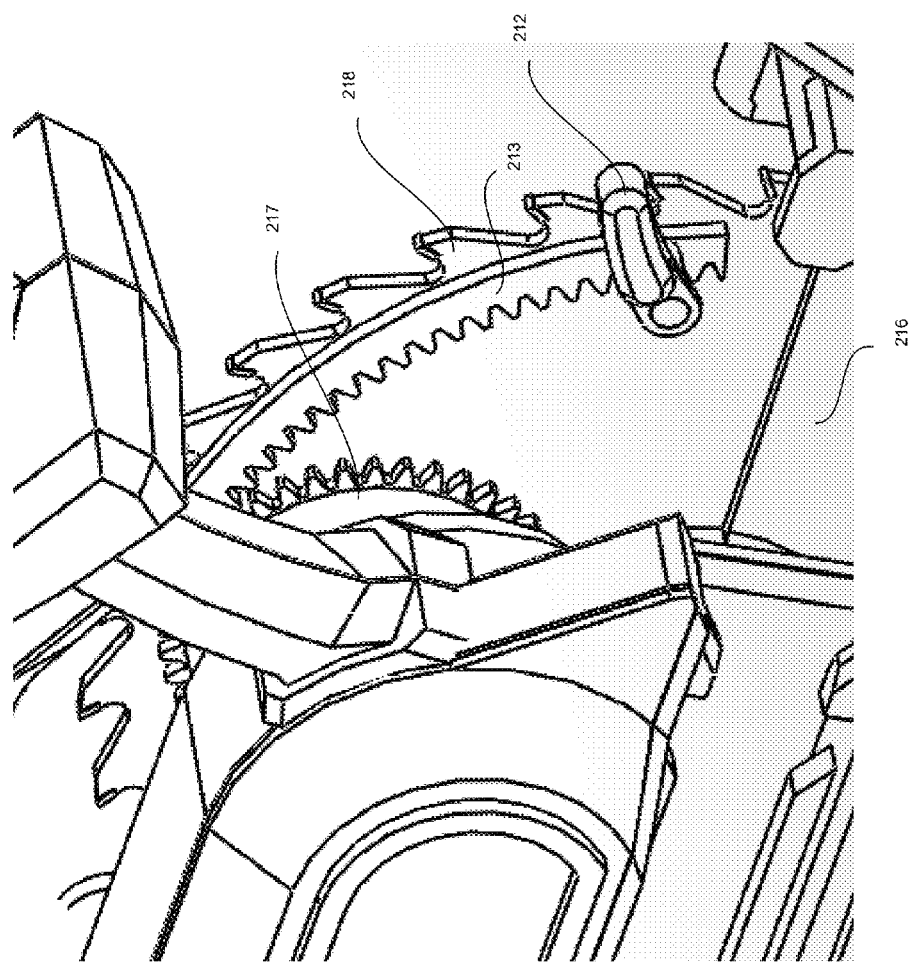
FIG. 15 illustrates a side perspective view of an exemplary blade guard lever of an exemplary blade guard mechanism with the circular saw housing removed, in accordance with an example embodiment of the present invention.

FIG. 14 illustrates a side view of an exemplary blade guard mechanism 126, 212 with the circular saw housing 214 removed, in accordance with an example embodiment of the present invention. FIG. 15 illustrates a side perspective view of an exemplary blade guard lever 212 of an exemplary blade guard mechanism 126, 212 with the circular saw housing 214 removed, in accordance with an example embodiment of the present invention. Referring to FIGS. 14-15, the blade guard mechanism comprises a support arm lever 126 and a blade guard lever 212.

The blade guard lever 212 is operable to extend and retract a blade guard 216. In an example embodiment, the blade guard lever 212 comprises a lever gear 213 that drives a blade guard gear 217 to extend the blade guard 216 to cover the blade 218 and retract the blade guard 216 to expose the blade 218. For example, the blade guard lever 212 may be moved in a first direction to an open position to retract the blade guard 216 such that the blade 218 of the circular saw 200 is exposed. The blade guard lever 212 is moved in the second direction to a closed position to extend the blade guard 216 to cover the blade 218. The blade guard lever 212 can be moved, for example, by a user when operated as a circular saw 200 or by the support arm lever 126 when operated as a miter saw.

The support arm lever 126 is operable to rotate at a gear 127 to extend and retract the support arm lever 126. The gear 127 is operable to rotate the support arm lever 126 based on rotation at the vertical pivot 104. For example, the support arm lever 126 is rotated to extend from the coupling arm when the coupling arm is rotated downward at the vertical pivot 104. The support arm lever 126 is rotated to retract to the coupling arm when the coupling arm is rotated upward at the vertical pivot 104.

The support arm lever 126 is operable to mate with and move a blade guard lever 212 of the circular saw 200 to open a blade guard 216 as the circular saw 200 attached to the coupling arm pivots downward at the vertical pivot 104, and to close the blade guard 216 as the circular saw 200 pivots upward. For example, a blade guard 216 can cover a blade 218 of the circular saw 200 when not in use to protect users and passersby from contacting the blade 218 of the circular saw 200. The support arm lever 126 can extend from the coupling arm and mate with the blade guard lever 212 to slide the blade guard lever 212 from a closed position to an open position as the circular saw 200 is pivoted to a cutting position.

Figure 2:
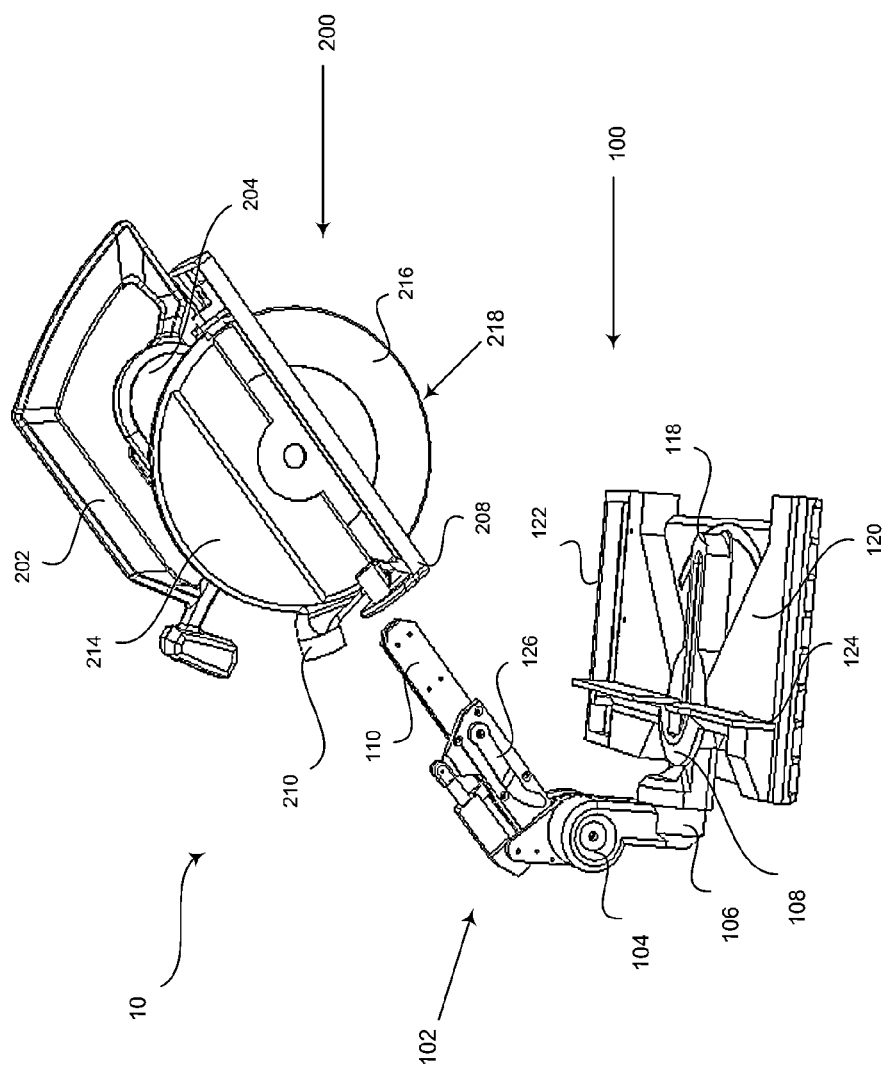
FIG. 2 illustrates a side perspective view of an exemplary miter saw assembly with a circular saw detached from a miter base, in accordance with an example embodiment of the present invention.

The blade guard mechanism 126, 212 illustrated in FIGS. 14-15 shares various characteristics with the blade guard mechanism 126, 212 illustrated in one or more of FIGS. 1-2 as described above.

Aspects of the present invention may be seen in a miter saw assembly 10. In an example embodiment of the present invention, the miter saw assembly 10 comprises a circular saw 200 and a miter base 100. The circular saw 200 comprises a circular blade 218, a motor 204, a power supply 206, and an attachment mechanism 220. The motor 204 is operable to rotate the circular blade 218. The power supply 206 is operable to provide power to the motor 204. The attachment mechanism 220 is detachably coupled with a coupling arm. The miter base 100 comprises a base 120 and a support arm 102. The support arm 102 comprises the coupling arm, a vertical pivot 104, and a horizontal pivot 108. The coupling arm is detachably coupled with the attachment mechanism 220. The vertical pivot 104 is operable to pivot the coupling arm in a vertical plane. The horizontal pivot is rotatably coupled with the base 120. The horizontal pivot 108 is operable to rotate the coupling arm in a horizontal plane.

In an example embodiment, the circular saw 200 comprises a blade guard 216 movable between an extended position covering the circular blade 218 and a retracted position exposing the circular blade 218. In various embodiments, the circular saw 200 comprises a blade guard lever 212 operable to move the blade guard 216 between the extended position and the retracted position. The blade guard lever 212 is movable between a closed position corresponding to the extended position of the blade guard 216 and an open position corresponding to the retracted position of the blade guard 216. In certain embodiments, the blade guard lever 212 comprises a lever gear 213 and the blade guard 216 comprises a blade guard gear 217. The lever gear 213 is movable with the blade guard lever 212 to drive the blade guard gear 217 to move the blade guard 216 between the extended position and the retracted position.

In various embodiments, the support arm 102 comprises a support arm lever 126 rotatably coupled to the support arm 102. The support arm lever 126 is operable to rotate between an inward position and an outward position. The support arm lever 126 is operable to move the blade guard lever 212 between the closed position and the open position as the support arm lever 126 rotates between the inward position and the outward position. In certain embodiments, the support arm lever 126 rotates from the inward position to the outward position as the coupling arm is pivoted downward at the vertical pivot 104. The support arm lever 126 rotates from the outward position to the inward position as the coupling arm is pivoted upward at the vertical pivot 104. In an example embodiment, the support arm lever 126 comprises a gear 127 that is rotated in unison with the vertical pivot 104 to rotate the support arm lever 126 between the inward position and the outward position.

In certain embodiments, the attachment mechanism 220 comprises a slot 222 formed in a housing 214 of the circular saw 200 between at least one slot indent 224, a slot side wall 228, a slot bottom wall 229, and a slot top wall 230. The coupling arm comprises a slide 110. The slide 110 is received within the slot 222 to detachably couple the coupling arm with the attachment mechanism 220. In an example embodiment, the slot 222 and the slide 110 are generally rectangular or square shaped. In various embodiments, the slot 222 and the slide 110 are generally trapezoidal shaped.

In an example embodiment, the attachment mechanism 220 comprises a tightening mechanism operable to apply pressure to the slide 110 such that the slide 110 is pushed against at least two of the at least one slot indent 224, the slot side wall 228, the slot bottom wall 229, and the slot top wall 230. In various embodiments, the slot 222 comprises a slide clamp 111 attached to at least one of the slot side wall 228, the slot bottom wall 229, and the slot top wall 230. The tightening mechanism is operable to apply pressure to the slide 110 by forcing the slide clamp 111 against the slide 110. In certain embodiments, the tightening mechanism is at least one screw that is extendable through the housing 214 into the slot 222.

In various embodiments, the coupling arm comprises a locking mechanism 114 operable to secure the slide 110 within the slot 222. In certain embodiments, the slot indent 224 comprises an indent gap 226. The locking mechanism 114 comprises a protrusion 115 operable to extend into the indent gap 226 to secure the slide 110 within the slot 222, and retract from the indent gap 226 to release the slide 110 such that the slide 110 is removable from the slot 222. In an example embodiment, the coupling arm comprises a locking lever 116 operable to move between a locked position and an unlocked position. The locking lever 116 is operable to extend the protrusion 115 when moved to the locked position and retract the protrusion 115 when moved to the unlocked position.

In certain embodiments, the support arm 102 comprises a bevel pivot 106 operable to tilt the coupling arm sideways. In an example embodiment, the bevel pivot 106 is operable to fold the circular saw 200 to lay on top of the base 120. In various embodiments, the circular saw 200 comprises a foot 208 operable to rest on a surface of a workpiece being cut by the circular blade 218. The foot 208 is movable to adjust a depth of a cut. The foot 208 automatically adjusts to remain generally parallel with the surface of the workpiece as the coupling arm is tilted sideways at the bevel pivot 106. In certain embodiments, the support arm 102 comprises sliding rails. The circular saw 200 detachably coupled to the miter base 100 is pushed towards a rear of the miter base 100 and pulled towards a front of the miter base 100 on the sliding rails.

Although devices and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A miter saw assembly comprising:
   a circular saw comprising:
      a circular blade,
      a motor operable to rotate the circular blade,
      a power supply operable to provide power to the motor,
      an attachment mechanism,
      a blade guard movable between an extended position covering the circular blade and a retracted position exposing the circular blade, and
      a blade guard lever operable to move the blade guard between the extended position and the retracted position, the blade guard lever movable between a closed position corresponding to the extended position of the blade guard and an open position corresponding to the retracted position of the blade guard, wherein the blade guard lever comprises a lever gear and the blade guard comprises a blade guard gear, and wherein the lever gear is movable with the blade guard lever to drive the blade guard gear to move the blade guard between the extended position and the retracted position; and
   a miter base comprising:
      a base, and
      a support arm comprising:
         a coupling arm detachably coupled with the attachment mechanism of the circular saw,
         a vertical pivot operable to pivot the coupling arm in a vertical plane, and
         a horizontal pivot rotatably coupled with the base, the horizontal pivot operable to rotate the coupling arm in a horizontal plane.

2. A miter saw assembly comprising:
   a circular saw comprising:
      a circular blade,
      a motor operable to rotate the circular blade,
      a power supply operable to provide power to the motor,
      an attachment mechanism,
      a blade guard movable between an extended position covering the circular blade and a retracted position exposing the circular blade, and
      a blade guard lever operable to move the blade guard between the extended position and the retracted position, the blade guard lever movable between a closed position corresponding to the extended position of the blade guard and an open position corresponding to the retracted position of the blade guard; and
   a miter base comprising:
      a base, and a support arm comprising:
  a coupling arm detachably coupled with the attachment mechanism of the circular saw,
  a vertical pivot operable to pivot the coupling arm in a vertical plane,
  a horizontal pivot rotatably coupled with the base, the horizontal pivot operable to rotate the coupling arm in a horizontal plane, and
  a support arm lever rotatably coupled to the support arm, the support arm lever operable to rotate between an inward position and an outward position, wherein the support arm lever is operable to move the blade guard lever between the closed position and the open position as the support arm lever rotates between the inward position and the outward position.

3. The miter saw assembly according to claim 2, wherein the support arm lever rotates from the inward position to the outward position as the coupling arm is pivoted downward at the vertical pivot, and the support arm lever rotates from the outward position to the inward position as the coupling arm is pivoted upward at the vertical pivot.

4. The miter saw assembly according to claim 3, wherein the support arm lever comprises a gear that is rotated in unison with the vertical pivot to rotate the support arm lever between the inward position and the outward position.

5. A miter saw assembly comprising:
a circular saw comprising:
  a circular blade,
  a motor operable to rotate the circular blade,
  a power supply operable to provide power to the motor, and
  an attachment mechanism; and
a miter base comprising:
  a base, and
  a support arm comprising:
    a coupling arm detachably coupled with the attachment mechanism of the circular saw,
    a vertical pivot operable to pivot the coupling arm in a vertical plane, and
    a horizontal pivot rotatably coupled with the base, the horizontal pivot operable to rotate the coupling arm in a horizontal plane, wherein:
  the attachment mechanism comprises a slot formed in a housing of the circular saw between at least one slot indent, a slot side wall, a slot bottom wall, and a slot top wall,
  the coupling arm comprises a slide, and
  the slide is received within the slot to detachably couple the coupling arm with the attachment mechanism.

6. The miter saw assembly according to claim 5, wherein the slot and the slide are generally rectangular or square shaped.

7. The miter saw assembly according to claim 5, wherein the slot and the slide are generally trapezoidal shaped.

8. The miter saw assembly according to claim 5, wherein the attachment mechanism comprises a tightening mechanism operable to apply pressure to the slide such that the slide is pushed against at least two of the at least one slot indent, the slot side wall, the slot bottom wall, and the slot top wall.

9. The miter saw assembly according to claim 8, wherein the slot comprises a slide clamp attached to at least one of the slot side wall, the slot bottom wall, and the slot top wall, and wherein the tightening mechanism is operable to apply pressure to the slide by forcing the slide clamp against the slide.

10. The miter saw assembly according to claim 8, wherein the tightening mechanism is at least one screw that is extendable through the housing into the slot.

11. The miter saw assembly according to claim 5, wherein the coupling arm comprises a locking mechanism operable to secure the slide within the slot.

12. The miter saw assembly according to claim 11, wherein the slot indent comprises an indent gap, and wherein the locking mechanism comprises a protrusion operable to:
  extend into the indent gap to secure the slide within the slot, and
  retract from the indent gap to release the slide such that the slide is removable from the slot.

13. The miter saw assembly according to claim 12, wherein the coupling arm comprises a locking lever operable to move between a locked position and an unlocked position, the locking lever operable to extend the protrusion when moved to the locked position and retract the protrusion when moved to the unlocked position.

* * * * *